(12) United States Patent
Sasaki

(10) Patent No.: US 12,155,034 B2
(45) Date of Patent: Nov. 26, 2024

(54) BATTERY

(71) Applicant: Panasonic Intellectual Property Management Co., Ltd., Osaka (JP)

(72) Inventor: Izuru Sasaki, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 713 days.

(21) Appl. No.: 17/340,136

(22) Filed: Jun. 7, 2021

(65) Prior Publication Data

US 2021/0296694 A1 Sep. 23, 2021

Related U.S. Application Data

(63) Continuation of application No. PCT/JP2019/034423, filed on Sep. 2, 2019.

(30) Foreign Application Priority Data

Dec. 28, 2018 (JP) .................. 2018-248079

(51) Int. Cl.
*H01M 10/0562* (2010.01)
*H01M 4/36* (2006.01)
(Continued)

(52) U.S. Cl.
CPC ....... *H01M 10/0562* (2013.01); *H01M 4/364* (2013.01); *H01M 4/66* (2013.01);
(Continued)

(58) Field of Classification Search
CPC ............ H01M 4/667; H01M 10/0468
See application file for complete search history.

(56) References Cited

U.S. PATENT DOCUMENTS

2011/0250485 A1 10/2011 Tsukuda
2015/0134172 A1 5/2015 Ose et al.
2021/0296695 A1* 9/2021 Sasaki .................. H01M 4/667

FOREIGN PATENT DOCUMENTS

JP 2008-257962 A 10/2008
JP 2011-154902 A 8/2011
(Continued)

OTHER PUBLICATIONS

Machine Translation of JP-2016018704-A from Espacenet, Feb. 1, 2016 (Year: 2016).*

(Continued)

*Primary Examiner* — Maria Laios
*Assistant Examiner* — Zackary Richard Cochenour
(74) *Attorney, Agent, or Firm* — Rimon P.C.

(57) ABSTRACT

A battery includes a power generating element containing a solid electrolyte, and a first member in contact with a principal surface of the power generating element. The principal includes a central portion and an end portion with a ring-like shape surrounding the central portion in a plan view. The first member includes a central region overlapping with the central portion of the principal surface in a plan view, and an end region overlapping with the end portion of the principal surface in a plan view. At least one of the central region or the end region is in contact with the principal surface. A Young's modulus of the end region is smaller than that of the central region.

19 Claims, 3 Drawing Sheets

(51) Int. Cl.
    *H01M 4/66*           (2006.01)
    *H01M 10/04*         (2006.01)
    *H01M 10/052*       (2010.01)
    *H01M 10/0565*      (2010.01)
    *H01M 10/0585*      (2010.01)

(52) U.S. Cl.
    CPC ........... *H01M 4/661* (2013.01); *H01M 4/667* (2013.01); *H01M 10/0468* (2013.01); *H01M 10/0481* (2013.01); *H01M 10/052* (2013.01); *H01M 10/0565* (2013.01); *H01M 10/0585* (2013.01)

(56) References Cited

FOREIGN PATENT DOCUMENTS

| | | | |
|---|---|---|---|
| JP | 2011-238504 A | | 11/2011 |
| JP | 2015-095281 | | 5/2015 |
| JP | 2016018704 A | * | 2/2016 |

OTHER PUBLICATIONS

The Extended European Search Report dated Jan. 7, 2022 for the related European Patent Application No. 19902934.9.
International Search Report of PCT application No. PCT/JP2019/034423 dated Nov. 12, 2019.
Indian Office Action dated Jan. 17, 2023 for the related Indian Patent Application No. 202147026812.

* cited by examiner

BATTERY

BACKGROUND

1. Technical Field

The present disclosure relates to a battery.

2. Description of the Related Art

Japanese Unexamined Patent Application Publication No. 2015-95281 discloses a system including a pressing unit that applies confining pressure to an all-solid-state battery, and a pressure control unit that controls the confining pressure, wherein the confining pressure is optionally controlled in accordance with charge and discharge.

SUMMARY

One non-limiting and exemplary embodiment provides a battery that is less likely to cause a short circuit.

In one general aspect, the techniques disclosed here feature a battery including a power generating element that contains a solid electrolyte, and a first member in contact with a first principal surface of the power generating element. The first principal surface includes a central portion and an end portion with a ring-like shape surrounding the central portion in a plan view. The first member includes a first central region overlapping with the central portion of the first principal surface in a plan view, and a first end region overlapping with the end portion of the first principal surface in a plan view. At least one of the first central region or the first end region is in contact with the first principal surface. A Young's modulus of the first end region is smaller than a Young's modulus of the first central region.

According to the present disclosure, the battery can be provided in which a short circuit is less likely to occur.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Summary of Present Disclosure

Figure 1:
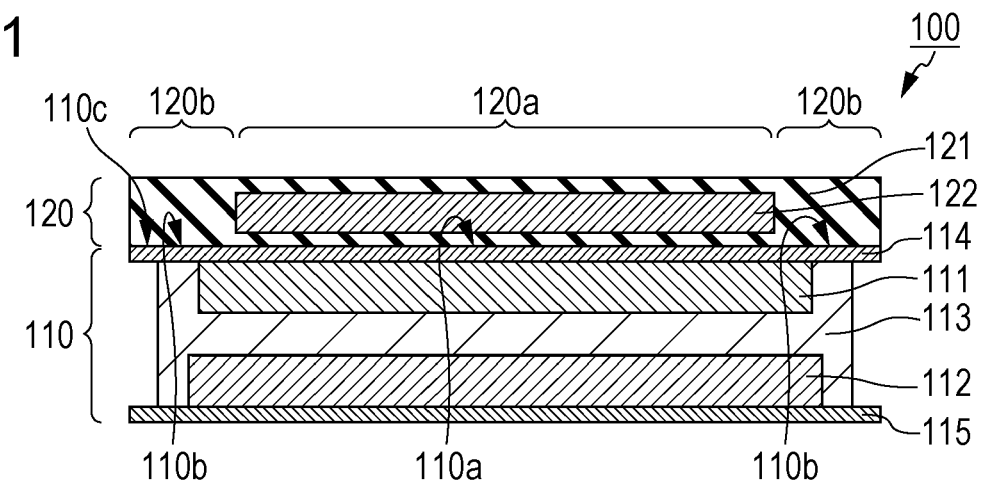
FIG. 1 is a sectional view illustrating a schematic structure of a battery according to Embodiment 1.

First, a point of view of the inventor will be described below.

In an all-solid-state battery, by confining the all-solid-state battery, charge-discharge characteristics are improved because of the fact that satisfactory contact is obtained between active substance particles and solid electrolyte particles and between the solid electrolyte particles, and that particle boundary resistance reduces. When the all-solid-state battery is not confined, satisfactory contact cannot be obtained between the particles and an effective reaction area reduces. Therefore, internal resistance of the all-solid-state battery increases. From that point of view, confining the battery is effective in improving performance of the all-solid-state battery.

On the other hand, in an end portion of the all-solid-state battery, a short-circuit failure is likely to occur due to excessive current concentration or contact between current collectors. When the all-solid-state battery is confined, current concentration at positive and negative electrodes in the end portion of the battery, physical contact between the positive and negative electrodes due to expansion and contraction when charged and discharged, or the contact between the current collectors is more likely to generate. Accordingly, a risk of the short-circuit failure increases. In Japanese Unexamined Patent Application Publication No. 2015-95281, for example, because a principal surface of the all-solid-state battery is entirely confined with uniform pressure, it is difficult to avoid the risk of the short circuit in the end portion of the battery.

In consideration of the above-described problem, the present disclosure is intended to improve charge-discharge characteristics by confining an all-solid-state battery while reducing a risk of a short circuit in an end portion.

To solve the above-described problem, a battery according to one aspect of the present disclosure includes a power generating element containing a solid electrolyte, and a first member in contact with a first principal surface of the power generating element. The first principal surface includes a central portion and an end portion with a ring-like shape surrounding the central portion in a plan view. The first member includes a first central region overlapping with the central portion of the first principal surface in a plan view, and a first end region overlapping with the end portion of the first principal surface in a plan view. At least one of the first central region or the first end region is in contact with the first principal surface. A Young's modulus of the first end region is smaller than a Young's modulus of the first central region.

With the above-described feature, when the battery is confined, pressure applied to an end portion of the power generating element is relieved. Since the pressure applied to the end portion is relieved, it is possible to suppress current concentration in the end portion and physical contact between electrodes of the power generating element. Accordingly, the battery can be realized in which a short circuit is less likely to occur in the end portion of the power generating element when the battery is confined.

For example, the first central region may be in contact with the central portion of the first principal surface, and the first end region may be in contact with the end portion of the first principal surface.

With the above-described feature, an abrupt pressure change at a boundary between a central portion and the end portion of the power generating element is less likely to generate than in the case in which the first member does not include the first end region. Hence the occurrence of cracking at the boundary can be suppressed. Furthermore, since strong pressure can be applied to the central portion of the power generating element, more satisfactory contact between particles can be obtained, whereby particle boundary resistance is reduced and charge-discharge characteristics are improved. Thus, the reliability and the charge-discharge characteristics of the battery according to this aspect can be increased.

For example, one of the first central region and the first end region may be in contact with the first principal surface.

With the above-described feature, the pressure applied to one between the central portion and the end portion of the power generating element can be reduced sufficiently.

For example, the first member may include a first portion and a second portion. A Young's modulus of the first portion may be smaller than a Young's modulus of the second portion. At least part of the first portion may be positioned within the first end region, and at least part of the second portion may be positioned within the first central region.

With the above-described feature, the first member in which the first end region and the first central region have different Young's moduli can easily be formed by using different materials.

For example, the first portion may cover a periphery of the second portion. Another part of the first portion may be positioned within the first central region.

With the above-described feature, the first member in which the first end region and the first central region have different Young's moduli can easily be formed.

For example, the first portion may contain resin, and the second portion may contain metal.

With the above-described feature, since a difference in Young's modulus between metal and resin is generally large, the pressure applied to the end portion of the power generating element can be further relieved.

For example, the resin may contain a conductive polymer.

With the above-described feature, since electrical conductivity can be given to the first member, the first member can be made also function as a current collector. In this case, the power generating element is no longer required to include the current collector, whereby a thickness of the power generating element can be reduced. Thus, since the thickness of the power generating element is reduced, an energy density of the power generating element can be increased.

For example, the first portion and the second portion may contain metal.

With the above-described feature, since electrical conductivity can be given to the first member, the first member can be made also function as a current collector. In this case, the power generating element is no longer required to include the current collector, whereby the thickness of the power generating element can be reduced. Thus, since the thickness of the power generating element is reduced, the energy density of the power generating element can be increased. Furthermore, when each of the first portion and the second portion contains metal, it is easier to reduce a difference in Young's modulus between the first and second portions, whereby the pressure change at the boundary between the first end region and the first central region is further relieved. As a result, a failure, such as cracking of the power generating element, attributable to the abrupt pressure change is even less likely to occur.

For example, the power generating element may include an electrode layer, and an area of the second portion may be smaller than an area of the electrode layer in a plan view.

With the above-described feature, since the pressure applied to an end portion of the electrode layer can be further relieved, the short circuit can be made even less likely to occur in the end portion of the power generating element.

For example, the power generating element may include an electrode layer, and an area of the second portion may be larger than an area of the electrode layer in a plan view.

With the above-described feature, since a contact degree between particles is increased due to pressure applied to a central portion of the electrode layer, the particle boundary resistance is reduced and the charge-discharge characteristics can be improved.

For example, the first member may be in contact with a surface of the electrode layer.

With the above-described feature, when the battery is confined, a pressure loss can be reduced and the pressure can be more effectively applied to the electrode layer.

For example, the first member may be a current collector.

With the above-described feature, since the power generating element is no longer required to include the current collector, the thickness of the power generating element can be reduced. Thus, since the thickness of the power generating element is reduced, the energy density of the power generating element can be increased.

For example, the power generating element may include a current collector, and the first member may be in contact with a surface of the current collector.

With the above-described feature, a positional relationship between the power generating element and the first member is fixed and a displacement of the first member can be suppressed. If the first member is displaced, there is a risk that strong pressure may be applied to the end portion as well. With the battery according to this aspect, since the displacement of the first member is suppressed, the short circuit can be made less likely to occur in the end portion of the power generating element.

For example, the first member may be an exterior body for the power generating element.

With the above-described feature, since a dedicated exterior body is no longer required, the thickness of the battery can be reduced.

For example, the battery may further include an exterior body that covers the power generating element. The first member may be positioned between the power generating element and the exterior body and may be in contact with an inner surface of the exterior body.

With the above-described feature, since the exterior body and the first member can be bonded to each other in advance, the first member is suppressed from moving within the exterior body. Thus, the positional relationship between the first member and the power generating element can easily be fixed, and hence strong pressure can be applied to the central portion of the power generating element when the battery is confined.

For example, the power generating element may further include an exterior body, and the first member may be positioned outside the exterior body and may be in contact with a surface of the exterior body.

With the above-described feature, since the positional relationship between the first member and the power generating element can easily be fixed, strong pressure can be applied to the central portion of the power generating element when the battery is confined.

For example, the battery may further include a second member in contact with a second principal surface of the power generating element on an opposite side to the first principal surface. The second principal surface may include a central portion and an end portion with a ring-like shape surrounding the central portion in a plan view. The second member may include a second central region overlapping with the central portion of the second principal surface in a plan view, and a second end region overlapping with the end portion of the second principal surface in a plan view. At least one of the second central region or the second end region may be in contact with the second principal surface. A Young's modulus of the second end region may be smaller than a Young's modulus of the second central region.

With the above-described feature, when the battery is confined, pressure applied to the end portion of the power generating element from both sides in a lamination direction is relieved. Since the pressure applied to the end portion is relieved, it is possible to suppress the current concentration in the end portion and the physical contact between the electrodes of the power generating elements. Accordingly, the battery can be realized in which the short circuit is less likely to occur in the end portion of the power generating element when the battery is confined.

For example, a thickness of the first end region may be equal to a thickness of the first central region.

With the above-described feature, the abrupt pressure change at the boundary between the central portion and the end portion of the power generating element is less likely to generate than in the case in which the first member does not include the first end region. Hence the occurrence of cracking at the boundary can be suppressed. Furthermore, since strong pressure can be applied to the central portion of the power generating element, more satisfactory contact between particles can be obtained, whereby the particle boundary resistance is reduced and the charge-discharge characteristics are improved. Thus, the reliability and the charge-discharge characteristics of the battery according to this aspect can be increased.

For example, a thickness of the first end region may be thicker than a thickness of the first central region.

With the above-described feature, the pressure applied to the central portion of the power generating element can be reduced sufficiently.

For example, a thickness of the first end region may be thinner than a thickness of the first central region.

With the above-described feature, the pressure applied to the end portion of the power generating element can be reduced sufficiently.

Embodiments will be described in detail below with reference to the drawings.

It is to be noted that each of the following embodiments represents a generic or specific example. Numerical values, shapes, materials, components, arrangement positions and connection forms of the components, steps, sequences of the steps, and so on, which are described in the following embodiments, are merely illustrative, and they are not purported to limit the present disclosure. Among the components in the following embodiments, those ones not stated in the independent claim are described as optional components.

The drawings are illustrated in a schematic manner and are not always exactly drawn in a strict sense. For example, scales and so on are not always matched between or among the drawings. Moreover, in the drawings, substantially the same components are denoted by the same reference signs, and duplicate description is omitted or simplified.

In this specification, the terms, such as "parallel", representing a relationship between elements, the terms, such as "rectangular", representing shapes of the elements, and ranges indicated by numerical values are expressions that are not always exactly true in a strict sense, and that indicate substantially the same relationship, shape, and range with an allowance of, for example, about several %.

In this specification, the terms "upper" and "lower" are not intended to indicate respectively an upward direction (vertically upward) and a downward direction (vertically downward) in absolute spatial recognition and are used as expressions that are specified in accordance with a relative positional relationship based on the order of lamination in a laminated multilayer structure. Furthermore, the terms "upper" and "lower" are applied to not only the case in which two components are arranged in a state spaced from each other and another component is present between the two components, but also the case in which two components are arranged so close to each other that the two components are in a contact state.

In this specification, the term "thickness direction" indicates a direction perpendicular to a surface of an electrode current collector on which an electrode layer is formed, or a surface of a counter-electrode current collector on which a counter electrode layer is formed. Furthermore, in this specification, the term "in a plan view" indicates the case of viewing the battery along the thickness direction of the battery.

Embodiment 1

FIG. 1 is a sectional view illustrating a schematic structure of a battery 100 according to Embodiment 1. As illustrated in FIG. 1, the battery 100 includes a power generating element 110 containing a solid electrolyte, and a first member 120 in contact with a principal surface 110c of the power generating element 110.

Power Generating Element

A structure of the power generating element 110 according to this embodiment is first described.

The power generating element 110 is, for example, a power generating unit with charge and discharge functions. The power generating element 110 is, for example, a secondary lithium battery. In another example, the power generating element 110 may be a single battery (cell).

As illustrated in FIG. 1, the power generating element 110 includes a positive electrode 111, a negative electrode 112, a solid electrolyte layer 113, a positive electrode current collector 114, and a negative electrode current collector 115.

The positive electrode 111 is an example of an electrode layer and is a layer containing a positive electrode active substance. The positive electrode 111 may be a positive electrode mixture layer containing the positive electrode active substance and the solid electrolyte.

The positive electrode active substance contained in the positive electrode 111 is given as, for example, a lithium-containing transition metal oxide, a transition metal fluoride, a polyanion or fluorinated-polyanion material, a transition metal sulfide, a transition metal oxyfluoride, a transition metal oxysulfide, or a transition metal oxynitride. For example, when the lithium-containing transition metal oxide is used as positive-electrode active substance particles, a production cost can be reduced and an average discharge voltage can be increased.

A thickness of the positive electrode 111 is, for example, more than or equal to 10 μm and less than or equal to 500 μm. When the thickness of the positive electrode 111 is more than or equal to 10 μm, an energy density of the battery can be ensured sufficiently. When the thickness of the positive electrode 111 is less than or equal to 500 μm, the battery can be operated with a high output.

The negative electrode 112 is an example of an electrode layer and is a layer containing a negative electrode active substance. The negative electrode 112 may be a negative electrode mixture layer containing the negative electrode active substance and the solid electrolyte.

The negative electrode active substance contained in the negative electrode 112 is given as, for example, a material occluding and releasing a metal ion. The negative electrode active substance is, for example, a material occluding and releasing a lithium ion. The negative electrode active substance may be given as, for example, lithium metal, metal or an alloy each of which exhibits an alloying reaction with lithium, carbon, a transition metal oxide, or a transition metal sulfide. The carbon may be given as, for example, graphite or a non-graphite carbon such as hard carbon or coke. The transition metal oxide may be given as, for example, CuO or NiO. The transition metal sulfide may be given as, for example, a copper sulfide denoted by CuS. The metal or the alloy each of which exhibits the alloying reaction with lithium may be given as, for example, an alloy of a silicon compound, a tin compound, or an aluminum compound and lithium. For example, when the carbon is used, the production cost can be reduced and the average discharge voltage can be increased.

A thickness of the negative electrode 112 is, for example, more than or equal to 10 μm and less than or equal to 500 μm. When the thickness of the negative electrode 112 is more than or equal to 10 μm, the energy density of the battery can be ensured sufficiently. When the thickness of the negative electrode 112 is less than or equal to 500 μm, the battery can be operated with a high output.

The solid electrolyte layer 113 contains a solid electrolyte. In this embodiment, the solid electrolyte layer 113 covers the entirety of each of the positive electrode 111 and the negative electrode 112. More specifically, the solid electrolyte layer 113 covers the entirety of the positive electrode 111, and a ring-shaped portion of the solid electrolyte layer 113 along an outer periphery of the positive electrode 111 is in contact with the positive electrode current collector 114 in a plan view. Furthermore, the solid electrolyte layer 113 covers the entirety of the negative electrode 112, and a ring-shaped portion of the solid electrolyte layer 113 along an outer periphery of the negative electrode 112 is in contact with the negative electrode current collector 115 in a plan view.

The solid electrolyte layer 113 may not need to completely cover at least one of the positive electrode 111 or the negative electrode 112. For example, the solid electrolyte layer 113 may not need to cover at least part of an end surface of the positive electrode 111. Moreover, the solid electrolyte layer 113 may not need to cover at least part of an end surface of the negative electrode 112. The solid electrolyte layer 113 may not need to contact with each of the positive electrode current collector 114 and the negative electrode current collector 115 and may be positioned only between the positive electrode 111 and the negative electrode 112.

A thickness of the solid electrolyte layer 113 is, for example, more than or equal to 1 μm and less than or equal to 200 μm. When the thickness of the solid electrolyte layer 113 is more than or equal to 1 μm, the possibility of a short circuit between the positive electrode 111 and the negative electrode 112 can be reduced. When the thickness of the solid electrolyte layer 113 is less than or equal to 200 μm, the battery can be operated with a high output.

The solid electrolyte contained in each of the positive electrode 111, the negative electrode 112, and the solid electrolyte layer 113 may be given as, for example, a sulfide solid electrolyte, an oxide solid electrolyte, a halide solid electrolyte, a polymer solid electrolyte, or a complex hydride solid electrolyte.

The sulfide solid electrolyte may be given as, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. For example, LiX, $Li_2O$, $MO_p$, or $Li_qMO_r$ may be added to each of the above-mentioned compounds. X in LiX denotes any of F, Cl, Br and I. M in $Li_qMO_r$ denotes any of P, Si, Ge, B, Al, Ga, In, Fe and Zn. Furthermore, p, q and r in $MO_p$ and $Li_qMO_r$ are natural numbers independently of one another.

The oxide solid electrolyte may be given as, for example, any of NASICON-type solid electrolytes represented by $LiTi_2(PO_4)_3$ and an element substituent thereof, a (LaLi)$TiO_3$-based perovskite solid electrolyte, LISICON-type solid electrolytes represented by $Li_{14}ZnGe_4O_{16}$, $Li_4SiO_4$, $LiGeO_4$, and an element substituent thereof, or garnet solid electrolytes represented by $Li_7La_3Zr_2O_{12}$ and an element substituent thereof. Instead, the oxide solid electrolyte may be given as, for example, any of $Li_3N$ and an H substituent thereof, $Li_3PO_4$ and an N substituent thereof, and glass or glass ceramics based on an Li—B—O compound, such as $LiBO_2$ or $Li_3BO_3$, and added with $Li_2SO_4$ or $Li_2CO_3$.

The halide solid electrolyte may be given as, for example, a material denoted by a composition formula $Li_\alpha M_\beta X_\gamma$. Here, α, β and γ are values greater than 0 which are independently of one another. Furthermore, M is at least one of a metal element other than Li or a metalloid element. X is one or two or more elements selected from the group consisting of Cl, Br, I and F. Here, the metalloid element is B, Si, Ge, As, Sb or Te. The metal element is one among all of the elements included in group 1 to group 12 of the periodic table except for hydrogen, and all of the elements included in group 13 to group 16 except for the above-mentioned metalloid elements, C, N, P, O, S and Se. In other words, the halide solid electrolyte indicates a group of elements each capable of becoming a cation when the element forms an inorganic compound with a halogen compound. The halide solid electrolyte may be given as, for example, $Li_3YX_6$, $Li_2MgX_4$, $Li_2FeX_4$, Li(Al, Ga, In)$X_4$, or $Li_3$(Al, Ga, In)$X_6$. Instead, the halide solid electrolyte may be given as, for example, $Li_3InBr_6$, $Li_3InCl_6$, $Li_2FeCl_4$, $Li_2CrCl_4$, or $Li_3OCl$.

The complex hydride solid electrolyte may be given as, for example, $LiBH_4$—LiI or $LiBH_4$—$P_2S_5$.

The polymer solid electrolyte may be given as, for example, a compound of a polymer compound and a lithium salt. The polymer compound may have an ethylene oxide structure. The polymer compound having the ethylene oxide structure can contain a larger amount of the lithium salt and can increase ion conductivity. The lithium salt may be given as, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One type of lithium salt selected from the above-mentioned examples may be solely used as the lithium salt. Instead, a mixture of two or more types of lithium salts selected from the above-mentioned examples may be used as the lithium salt.

The positive electrode current collector 114 is disposed in contact with the positive electrode 111. In this embodiment, the positive electrode current collector 114 is included in the power generating element 110. The positive electrode current collector 114 is a thin film with electrical conductivity.

The positive electrode current collector 114 may be given as, for example, a porous or nonporous sheet or film made of a metal material such as aluminum, stainless steel, titanium, or an alloy of any of those metals. Aluminum or an aluminum alloy is inexpensive and is easy to form a thin film. The sheet or the film is, for example, a metal foil or mesh.

A thickness of the positive electrode current collector 114 is, for example, more than or equal to 1 μm and less than or equal to 30 μm. When the thickness of the positive electrode current collector 114 is more than or equal to 1 μm, mechanical strength is sufficient and the positive electrode current collector 114 is less likely to crack or break. When the thickness of the positive electrode current collector 114 is less than or equal to 30 μm, a drop of the energy density of the battery can be suppressed.

The negative electrode current collector 115 is disposed in contact with the negative electrode 112. In this embodiment, the negative electrode current collector 115 is included in the power generating element 110. The negative electrode current collector 115 is a thin film with electrical conductivity.

The negative electrode current collector 115 may be given as, for example, a porous or nonporous sheet or film made of a metal material such as stainless steel, nickel, copper, or an alloy of any of those metals. Copper or a copper alloy is inexpensive and is easy to form a thin film. The sheet or the film is, for example, a metal foil or mesh.

A thickness of the negative electrode current collector 115 is, for example, more than or equal to 1 μm and less than or equal to 30 μm. When the thickness of the negative electrode current collector 115 is more than or equal to 1 μm, mechanical strength is sufficient and the negative electrode current collector 115 is less likely to crack or break. When the thickness of the negative electrode current collector 115 is less than or equal to 30 μm, a drop of the energy density of the battery can be suppressed.

At least one of the positive electrode 111, the solid electrolyte layer 113, or the negative electrode 112 may contain a binding agent for the purpose of increasing adhesion between particles. The binding agent is used to increase the binding property of a material of the electrode or the solid electrolyte layer. The binding agent is, for example, polyvinylidene fluoride, polytetrafluoroethylene, polyethylene, polypropylene, aramid resin, polyamide, polyimide, polyamideimide, polyacrylonitrile, polyacrylic acid, polyacrylic methyl ester, polyacrylic ethyl ester, polyacrylic hexyl ester, polymethacrylic acid, polymethacrylic methyl ester, polymethacrylic ethyl ester, polymethacrylic hexyl ester, polyvinyl acetate, polyvinyl pyrrolidone, polyether, polyethersulfone, hexafluoropolypropylene, styrene-butadiene rubber, or carboxymethyl cellulose. Instead, the binding agent may be given as, for example, a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Furthermore, two or more selected from the above-mentioned materials may be mixed and used as the binding agent.

At least one of the positive electrode 111 or the negative electrode 112 may contain a conductive aid for the purpose of increasing electron conductivity. The conductive aid may be given as, for example, any of graphite such as natural graphite or artificial graphite, carbon blacks such as acetylene black and Ketjen black, conductive fibers such as a carbon fiber and a metal fiber, carbon fluoride, metal powder such as made of aluminum, conductive whiskers such as made of zinc oxide and potassium titanate, conductive metal oxides such as titanium oxide, and conductive polymer compounds such as polyaniline, polypyrrole, and polythiophene. When the carbon conductive aid is used, the cost can be reduced.

In this embodiment, the principal surface 110c of the power generating element 110 is an example of a first principal surface of the power generating element 110. More specifically, the principal surface 110c is a principal surface of the positive electrode current collector 114 on a side where the positive electrode 111 is not disposed.

A central portion 110a of the principal surface 110c of the power generating element 110 corresponds to a portion where all the positive electrode 111, the solid electrolyte layer 113, and the negative electrode 112 overlap with one another in a plan view. More specifically, a shape of the central portion 110a in a plan view matches with that of one among the positive electrode 111, the solid electrolyte layer 113, and the negative electrode 112 in a plan view, the one having a minimum size. In the example illustrated in FIG. 1, the shape of the central portion 110a in a plan view matches with the shape of the positive electrode 111 in a plan view.

An end portion 110b is a portion surrounding the central portion 110a. The end portion 110b has a ring-like shape surrounding the central portion 110a in a plan view. For example, the end portion 110b corresponds to the entire remaining portion of the principal surface 110c except for the central portion 110a in a plan view.

First Member

The first member 120 will be described below.

The first member 120 is in contact with the principal surface 110c of the power generating element 110. In this embodiment, the first member 120 is a member in the form of a flat plate. As illustrated in FIG. 1, the first member 120 includes a central region 120a and an end region 120b in a plan view. The central region 120a and the end region 120b are different regions in a plan view.

The central region 120a is an example of a first central region and overlaps with the central portion 110a of the principal surface 110c of the power generating element 110 in a plan view. In this embodiment, the central region 120a is in contact with the central portion 110a. A shape of the central region 120a in a plan view is rectangular, for example. However, the shape of the central region 120a in a plan view is not limited to a particular one and may be circular.

The end region 120b is an example of a first end region and overlaps with the end portion 110b of the principal surface 110c of the power generating element 110 in a plan view. In this embodiment, the end region 120b is in contact with the end portion 110b. The end region 120b has a ring-like shape surrounding the central region 120a in a plan view. For example, the end region 120b has a rectangular ring-like shape with a uniform width.

As illustrated in FIG. 1, a thickness of the first member 120 in the end region 120b is the same as that in the central region 120a. Accordingly, since adhesion between the power generating element 110 and the first member 120 increases, a pressure loss can be reduced and pressure can be more efficiently applied when the battery 100 is confined.

In this embodiment, a Young's modulus of the end region 120b is smaller than that of the central region 120a. More specifically, the first member 120 includes a first portion 121 and a second portion 122 of which Young's moduli are different from each other. The Young's modulus of the first portion 121 is smaller than that of the second portion 122. The Young's modulus of the central region 120a is provided as a value that is calculated from the Young's moduli of the first portion 121 and the second portion 122 both included in the central region 120*a* in accordance with the compound rule based on a volume ratio between the first portion 121 and the second portion 122.

The first portion 121 is positioned in the end region 120*b*. In this embodiment, the first portion 121 is positioned in both the end region 120*b* and the central region 120*a* while covering a periphery of the second portion 122. The first portion 121 covers an entire surface of the second portion 122.

The second portion 122 is positioned in the central region 120*a*. In this embodiment, the central region 120*a* matches with the second portion 122 in a plan view. In other words, when looking at the first member 120 in a plan view, a region where the second portion 122 is disposed corresponds to the central region 120*a*. Because the entire surface of the second portion 122 is covered with the first portion 121, the second portion 122 is not exposed to the outside.

The first member 120 of a structure including the second portion 122 covered with the first portion 121 is easy to manufacture. The first member 120 can be simply manufactured by, for example, a method of bonding two sheets of the first portion 121 to the second portion 122 from above and below, or a method of coating the second portion 122 with the first portion 121.

Pressures applied to the end portion 110*b* and the central portion 110*a* of the power generating element 110 can be optionally adjusted by adjusting the Young's moduli, thicknesses, areas, and so on of the first portion 121 and the second portion 122. A pressure distribution applied to the end portion 110*b* and the central portion 110*a* of the power generating element 110 can be adjusted by adjusting, for example, the Young's moduli of the materials used for the first portion 121 and the second portion 122.

In this embodiment, the first portion 121 is insulating to electrons. The first portion 121 contains resin, for example, and the second portion 122 contains metal, for example. Generally, a difference in Young's modulus between resin and metal is large. Therefore, the pressure applied to the end portion 110*b* of the power generating element 110 can be further relieved. Moreover, the first member 120 can easily be manufactured by, for example, a method of bonding the first portion 121 in the form of a sheet containing resin to the second portion 122 containing metal from above and below, or a method of coating the second portion 122 containing metal with the first portion 121 containing resin.

The resin contained in the first portion 121 may be given as, for example, any of organic polymers such as polyvinylidene fluoride, polytetrafluoroethylene, polyethylene, polypropylene, aramid resin, polyamide, polyimide, polyamideimide, polyacrylonitrile, polyacrylic acid, polyacrylic methyl ester, polyacrylic ethyl ester, polyacrylic hexyl ester, polymethacrylic acid, polymethacrylic methyl ester, polymethacrylic ethyl ester, polymethacrylic hexyl ester, polyvinyl acetate, polyvinyl pyrrolidone, polyether, polyethersulfone, hexafluoropolypropylene, and carboxymethyl cellulose. Instead, the resin contained in the first portion 121 may be given as, for example, any of various rubbers such as silicone rubber, chloroprene rubber, nitril-butadiene rubber, ethylene-propylene rubber, chlorosulphonated polyethylene rubber, acrylic rubber, urethane rubber, fluorine rubber, polysulfide rubber, natural rubber, isoprene rubber, styrene-butadiene rubber, butyl rubber, and butadiene rubber.

The metal contained in the second portion 122 may be given as, for example, aluminum, stainless steel, titanium, nickel, copper, magnesium, or an alloy of any of those metals.

At least one of the first portion 121 or the second portion 122 may contain an inorganic material. The inorganic material contained in the first portion 121 or the second portion 122 may be given as, for example, any of simple oxides such as $SiO_2$, $MgO$, $Al_2O_3$, and $ZrO_2$, complex oxides containing two or more simple oxides, metal nitrides such as AlN and $Si_3N_4$, and metal carbides such as SiC.

A thickness of the first member 120 is, for example, more than or equal to 5 µm and less than or equal to 5000 µm. When the thickness of the first member 120 is more than or equal to 5 µm, mechanical strength is sufficient and the first member 120 is less likely to crack or break. In addition, pressure at a boundary between the end region 120*b* and the central region 120*a* can be relieved sufficiently. When the thickness of the first member 120 is less than or equal to 5000 µm, the energy density of the battery 100 can be increased.

In this embodiment, an area of the second portion 122 is smaller than that of the electrode layer in a plan view. More specifically, the area of the second portion 122 is smaller than that of the positive electrode 111 in a plan view. Furthermore, the area of the second portion 122 is smaller than that of the negative electrode 112 in a plan view. The area of the second portion 122 may be smaller than that of one between the positive electrode 111 and the negative electrode 112 and may be larger than that of the other electrode in a plan view.

Under those conditions, in each of the positive electrode 111 and the negative electrode 112, the pressure applied when the battery is confined is relieved in a portion of the electrode overlapping with the end region 120*b* in comparison with a portion of the electrode overlapping with the central region 120*a* in a plan view. It is hence possible to suppress not only excessive current concentration in the end portion of each of the positive electrode 111 and the negative electrode 112, but also physical contact between the components due to expansion and contraction when charged and discharged.

Advantageous Effects and Others

In this embodiment, the first member 120 is disposed to suppress the pressure acting in the thickness direction of the power generating element 110, namely, to suppress the power generating element 110 from directly receiving the pressure applied from above and below, when the battery 100 is confined. In other words, with the provision of the first member 120, a failure such as cracking is less likely to occur in the components of the power generating element 110.

If the first member 120 is made of a single material and the end region 120*b* and the central region 120*a* have the same Young's modulus, confining pressure is uniformly applied to the power generating element 110 through the first member 120 when the battery 100 is confined. In that case, the pressure is uniformly applied to the end portion 110*b* of the power generating element 110 as well. Accordingly, the current concentration and the physical contact between the positive electrode 111 or the positive electrode current collector 114 and the negative electrode 112 or the negative electrode current collector 115 are more likely to generate. Hence a short-circuit failure is more likely to occur.

If the first member 120 includes only the central region 120*a* and does not include the end region 120*b*, pressure is applied to only the central portion 110*a* of the power generating element 110 and no pressure is applied to the end portion 110*b* when the battery 100 is confined. Therefore, an abrupt pressure change generates at a boundary between the central portion 110*a* and the end portion 110*b* of the power generating element 110. This may invite the risk of causing a failure, such as cracking, in the components of the power generating element 110 positioned right under the boundary, namely the positive electrode current collector 114, the positive electrode 111, the negative electrode 112, the solid electrolyte layer 113, and the negative electrode current collector 115.

On the other hand, in this embodiment, the Young's modulus of the end region 120b of the first member 120 is smaller than that of the central region 120a. Therefore, when pressure is applied to the first member 120 from above and below with the battery 100 being confined, the applied pressure is relieved in the end region 120b in which the Young's modulus is relatively small. Accordingly, the pressure applied to the end portion 110b of the power generating element 110 is weaker than that applied to the central portion 110a thereof. As a result, the current concentration and the physical contact between the positive electrode 111 or the positive electrode current collector 114 and the negative electrode 112 or the negative electrode current collector 115 are less likely to generate in the end portion 110b of the power generating element 110.

Moreover, since the pressure change at the boundary between the end region 120b and the central region 120a is relieved in comparison with the case in which the first member 120 does not include the end region 120b, the failure, such as cracking of the power generating element 110, attributable to the abrupt pressure change is less likely to occur. On the other hand, since the central region 120a has the larger Young's modulus than the end region 120b, higher pressure is applied to the central region 120a when the battery 100 is confined. Accordingly, satisfactory contact is obtained between active substance particles and solid electrolyte particles and between the solid electrolyte particles. As a result, internal resistance of the battery 100 is reduced and charge-discharge characteristics of the battery 100 are improved.

According to this embodiment, as described above, it is possible to reduce the risk of a short circuit in the end portion and to improve the charge-discharge characteristics when the battery 100 is confined.

An area of a principal surface of the battery 100 may be in a range of more than or equal to 1 cm$^2$ to less than or equal to 100 cm$^2$ in the case in which the battery is used for a portable electronic device such as a smartphone or a digital camera. Instead, the area of the principal surface of the battery 100 may be in a range of more than or equal to 100 cm$^2$ to less than or equal to 1000 cm$^2$ in the case in which the battery is used for a power supply of a large-size mobile apparatus such as an electric vehicle.

Embodiment 2

Embodiment 2 will be described below.

Figure 2:
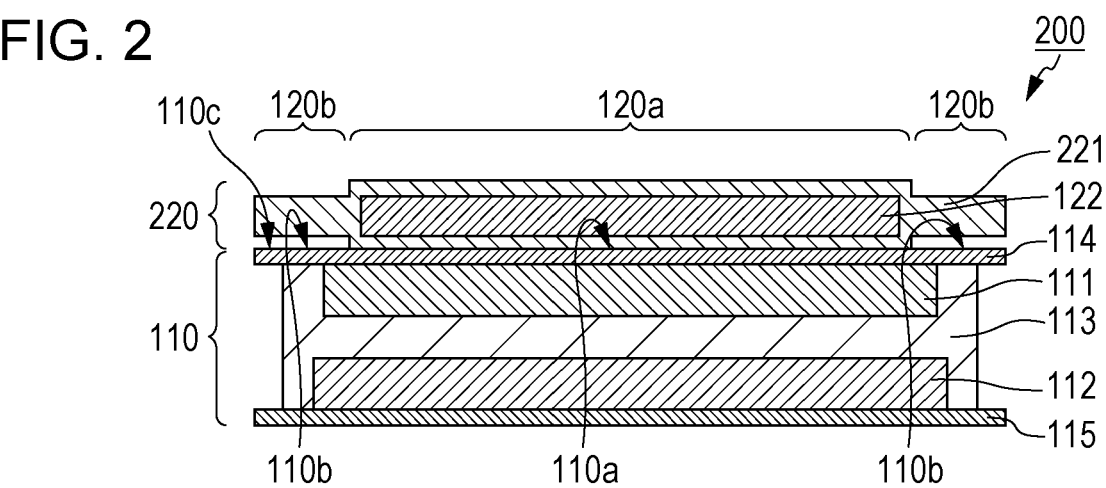
FIG. 2 is a sectional view illustrating a schematic structure of a battery according to Embodiment 2.

FIG. 2 is a sectional view illustrating a schematic structure of a battery 200 according to this embodiment. As illustrated in FIG. 2, comparing with the battery 100 according to Embodiment 1, the battery 200 according to this embodiment is different in including a first member 220 instead of the first member 120. In the following, different points from Embodiment 1 are primarily described and description of common points is omitted or simplified.

As illustrated in FIG. 2, unlike the first member 120 in Embodiment 1, the first member 220 includes a first portion 221 instead of the first portion 121. The first portion 221 is not in contact with the power generating element 110 in an end region 120b.

In other words, in the first member 220, a central region 120a is in contact with the central portion 110a of the power generating element 110, but the end region 120b is not in contact with the end portion 110b of the power generating element 110. More specifically, a thickness of the first member 220 in the end region 120b is thinner than that in the central region 120a. In more detail, the first portion 221 of the first member 220 is formed such that the thickness in the end region 120b is thinner than the sum of a thickness of a second portion 122 and a thickness of the first portion 221 in the central region 120a. For example, the thickness of the first portion 221 is equal to that of the second portion 122, but it is not limited to such a case.

With the above-described structure, stronger pressure can be selectively applied to the central region 120a.

Furthermore, a pressure distribution applied to the end region 120b and the central region 120a can be adjusted by adjusting the Young's moduli of the materials used for the first portion 221 and the second portion 122 and the thicknesses in the central region 120a and the end region 120b. In this respect, the adjustment needs to be made such that the thickness in the central region 120a after compression becomes thinner than that in the end region 120b before the compression. If the thickness in the central region 120a after the compression is thicker than that in the end region 120b before the compression, the power generating element 110 and the end region 120b do not physically contact with each other, and hence pressure cannot be applied to the end portion 110b. FIG. 2 illustrates the first member 220 before the compression. Upon the application of pressure, the central region 120a is compressed and the thickness in the central region 120a becomes substantially equal to that in the end region 120b.

Embodiment 3

Embodiment 3 will be described below.

Figure 3:
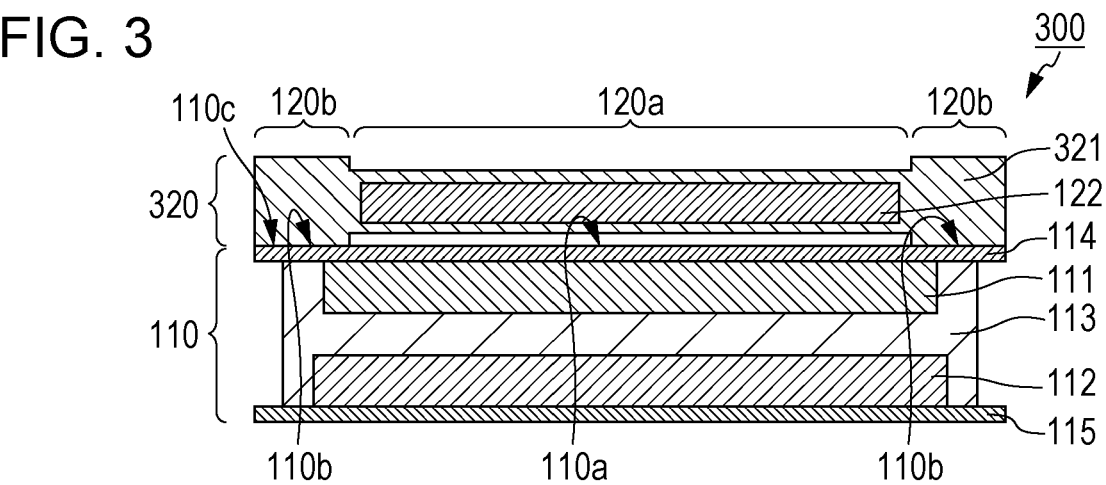
FIG. 3 is a sectional view illustrating a schematic structure of a battery according to Embodiment 3.

FIG. 3 is a sectional view illustrating a schematic structure of a battery 300 according to this embodiment. As illustrated in FIG. 3, comparing with the battery 100 according to Embodiment 1, the battery 300 according to this embodiment is different in including a first member 320 instead of the first member 120. In the following, different points from Embodiment 1 are primarily described and description of common points is omitted or simplified.

As illustrated in FIG. 3, unlike the first member 120 in Embodiment 1, the first member 320 includes a first portion 321 instead of the first portion 121. The first portion 321 is not in contact with the power generating element 110 in a central region 120a.

In other words, in the first member 320, an end region 120b is in contact with the end portion 110b of the power generating element 110, but the central region 120a is not in contact with the central portion 110a of the power generating element 110. More specifically, a thickness of the first member 320 in the end region 120b is thicker than that in the central region 120a. In more detail, the first portion 321 of the first member 320 is formed such that the thickness in the end region 120b is thicker than the sum of a thickness of a second portion 122 and a thickness of the first portion 321 in the central region 120a.

With the above-described structure, stronger pressure can be selectively applied to the end region 120b.

Furthermore, a pressure distribution applied to the end region 120b and the central region 120a can be adjusted by adjusting the Young's moduli of the materials used for the first portion 321 and the second portion 122 and the thicknesses in the central region 120a and the end region 120b. In this respect, the adjustment needs to be made such that the thickness in the end region 120b after compression becomes thinner than that in the central region 120a before the compression. If the thickness in the end region 120b after the compression is thicker than that in the central region 120a before the compression, the power generating element 110 and the central region 120a do not physically contact with each other, and hence pressure cannot be applied to the central portion 110a. FIG. 3 illustrates the first member 320 before the compression. Upon the application of pressure, the end region 120b is compressed and the thickness in the end region 120b becomes substantially equal to that in the central region 120a.

Embodiment 4

Embodiment 4 will be described below.

Figure 4:
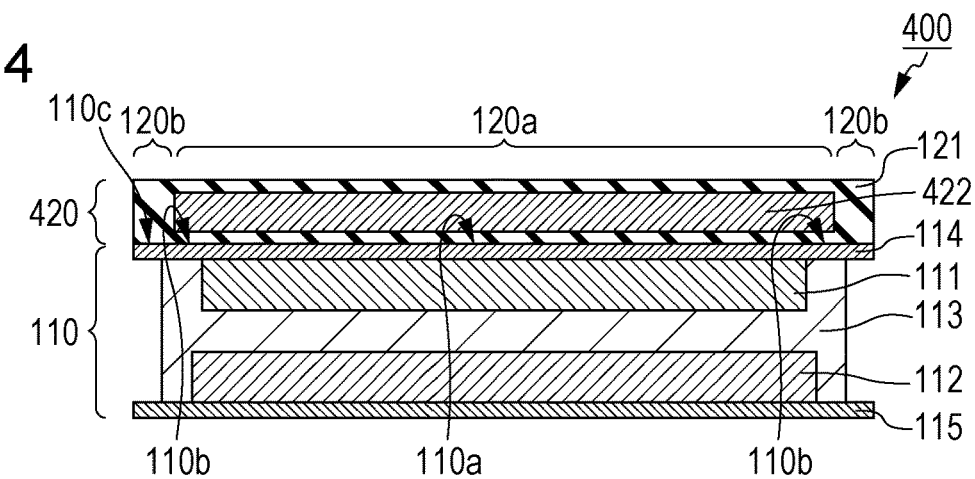
FIG. 4 is a sectional view illustrating a schematic structure of a battery according to Embodiment 4.

FIG. 4 is a sectional view illustrating a schematic structure of a battery 400 according to this embodiment. As illustrated in FIG. 4, comparing with the battery 100 according to Embodiment 1, the battery 400 according to this embodiment is different in including a first member 420 instead of the first member 120. In the following, different points from Embodiment 1 are primarily described and description of common points is omitted or simplified.

As illustrated in FIG. 4, unlike the first member 120 in Embodiment 1, the first member 420 includes a second portion 422 instead of the second portion 122. In this embodiment, an area of the second portion 422 is larger than that of the electrode layer in a plan view. More specifically, the area of the second portion 422 is larger than that of the positive electrode 111 in a plan view. Furthermore, the area of the second portion 422 is larger than that of the negative electrode 112 in a plan view. The area of the second portion 422 may be larger than that of one between the positive electrode 111 and the negative electrode 112 and may be smaller than that of the other electrode in a plan view.

Under those conditions, when the battery 400 is confined, pressure is uniformly applied to the positive electrode 111 and the negative electrode 112 each overlapping with the central region 120a. Therefore, a contact degree between particles is increased and battery characteristics are improved. On the other hand, in the end portion of the power generating element 110, the pressure applied when the battery is confined is relieved. It is hence possible to suppress the short circuit attributable to, for example, physical contact between the positive electrode current collector 114 and the negative electrode current collector 115.

Embodiment 5

Embodiment 5 will be described below.

Figure 5:
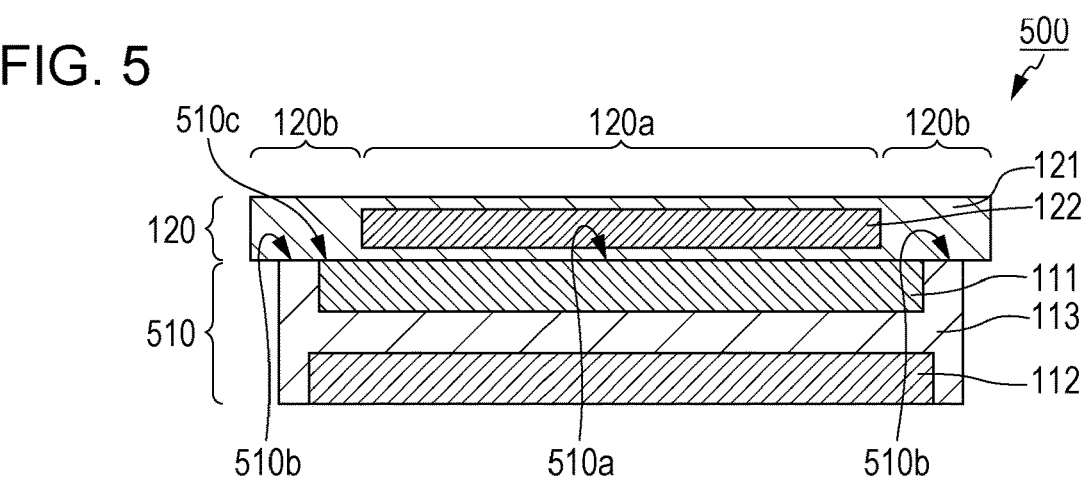
FIG. 5 is a sectional view illustrating a schematic structure of a battery according to Embodiment 5.

FIG. 5 is a sectional view illustrating a schematic structure of a battery 500 according to this embodiment. As illustrated in FIG. 5, comparing with the battery 100 according to Embodiment 1, the battery 500 according to this embodiment is different in including a power generating element 510 instead of the power generating element 110. In the following, different points from Embodiment 1 are primarily described and description of common points is omitted or simplified.

As illustrated in FIG. 5, unlike the power generating element 110 according to Embodiment 1, the power generating element 510 does not include the positive electrode current collector 114 and the negative electrode current collector 115. In other words, the power generating element 510 includes only the positive electrode 111, the negative electrode 112, and the solid electrolyte layer 113.

Since the power generating element 510 does not include the positive electrode current collector 114, a principal surface 510c of the power generating element 510 corresponds to a principal surface of the positive electrode 111 and to part of the solid electrolyte layer, the part being in flush with the principal surface of the positive electrode 111. More specifically, a central portion 510a of the principal surface 510c is the principal surface of the positive electrode 111 on an opposite side to a side where the negative electrode 112 is positioned. The central portion 510a is in contact with the central region 120a of the first member 120.

An end portion 510b of the principal surface 510c is part of the solid electrolyte layer and is in contact with the first member 120. The end portion 510b is in contact with the end region 120b of the first member 120.

In this embodiment, the first member 120 is a current collector. Thus, the first member 120 has electrical conductivity.

For example, the resin contained in the first portion 121 contains a conductive polymer. Since electron conductivity is given to the first portion 121, the first member 120 can be used as a current collector. The conductive polymer contained in the first portion 121 may be given as, for example, polyacetylene, polyaniline, polypyrrole, or polythiophene.

Each of the first portion 121 and the second portion 122 may contain metal. The metal contained in the first portion 121 is, for example, one selected from a selection group of metals that can be used as the metals to be contained in the second portion 122. The metal contained in the first portion 121 and the metal contained in the second portion 122 may be the same or different from each other.

When each of the first portion 121 and the second portion 122 contains metal, it is easier to reduce a difference in Young's modulus between the first and second portions, whereby the pressure change at the boundary between the end region 120b and the central region 120a is further relieved. As a result, the failure, such as cracking of the power generating element 510, attributable to the abrupt pressure change is even less likely to occur. Moreover, since electron conductivity is given to the first portion 121, the first member 120 can be used as a current collector.

As described above, with the battery 500 according to this embodiment, since the first member 120 further functions as the current collector, the power generating element 510 is no longer required to include the current collector, whereby a thickness of the power generating element 510 can be reduced. Since the thickness of the power generating element 510 is reduced, the energy density of the power generating element 510 can be increased.

In this embodiment, the first member 120 is in contact with the surface of the positive electrode 111. Accordingly, when the battery is confined, the pressure loss can be reduced and the pressure can be more efficiently applied to the positive electrode 111.

Embodiment 6

Embodiment 6 will be described below.

Figure 6:
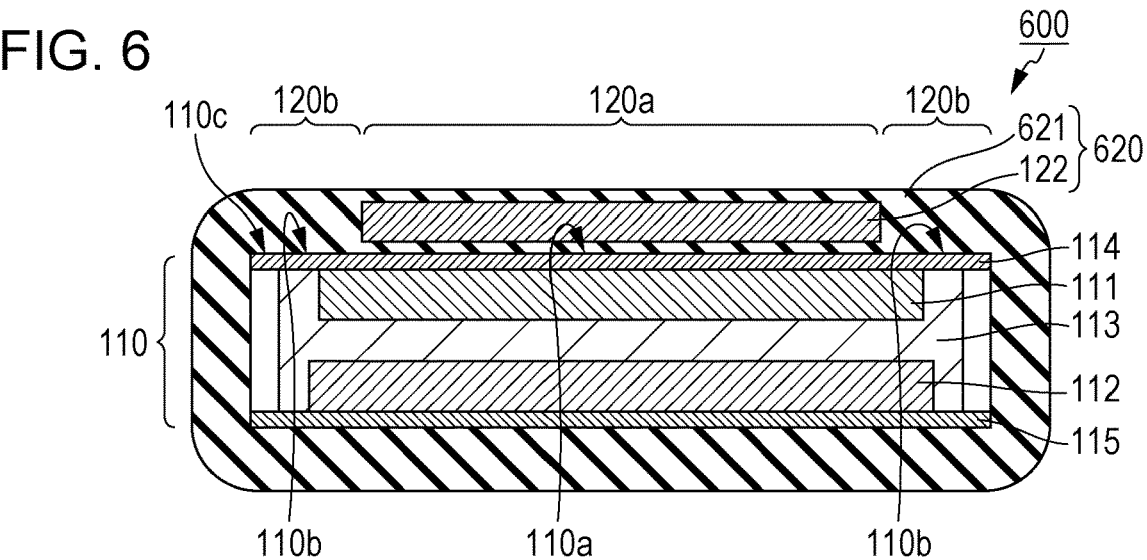
FIG. 6 is a sectional view illustrating a schematic structure of a battery according to Embodiment 6.

FIG. 6 is a sectional view illustrating a schematic structure of a battery 600 according to this embodiment. As illustrated in FIG. 6, comparing with the battery 100 according to Embodiment 1, the battery 600 according to this embodiment is different in including a first member 620 instead of the first member 120. In the following, different points from Embodiment 1 are primarily described and description of common points is omitted or simplified.

As illustrated in FIG. 6, the first member 620 is an exterior body for the power generating element 110. The first member 620 includes a first portion 621 and a second portion 122. The second portion 122 is the same as the second portion 122 in Embodiment 1.

The first portion 621 is disposed, as illustrated in FIG. 6, to surround the entirety of the power generating element 110. A Young's modulus and a material of the first portion 621 are the same as those of the first portion 121 in Embodiment 1. The first portion 621 is formed using, for example, an insulating resin material.

As described above, in the battery 600 according to this embodiment, the first member 620 further functions as the exterior body. Thus, since there is no need of including a dedicated exterior body, a thickness of the battery 600 can be reduced.

Embodiment 7

Embodiment 7 will be described below.

Figure 7:
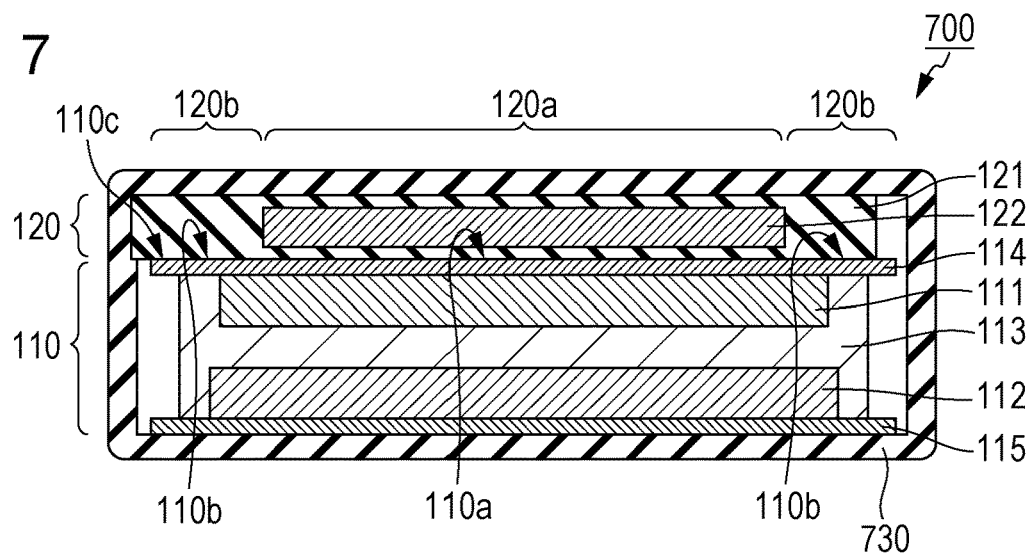
FIG. 7 is a sectional view illustrating a schematic structure of a battery according to Embodiment 7.

FIG. 7 is a sectional view illustrating a schematic structure of a battery 700 according to this embodiment. As illustrated in FIG. 7, comparing with the battery 100 according to Embodiment 1, the battery 700 according to this embodiment is different in additionally including an exterior body 730. In the following, different points from Embodiment 1 are primarily described and description of common points is omitted or simplified.

As illustrated in FIG. 7, the power generating element 110 is covered with the exterior body 730. More specifically, the exterior body 730 surrounds the entirety of the power generating element 110. The exterior body 730 is formed using, for example, an insulating resin material. The resin material forming the exterior body 730 may be given as, for example, the same material as the resin material included in the first portion 121 of the first member 120.

In this embodiment, the first member 120 is positioned between the power generating element 110 and the exterior body 730 and is in contact with an inner surface of the exterior body 730. For example, the first member 120 is bonded to the inner surface of the exterior body 730. Since the first member 120 is in direct contact with the power generating element 110, the pressure loss can be reduced and the pressure can be more efficiently applied to the power generating element 110 when the battery 700 is confined.

Furthermore, since the first member 120 is bonded to the inner surface of the exterior body 730, the first member 120 can be more easily arranged between the power generating element 110 and the exterior body 730 in manufacturing the battery 700. For example, the battery 700 is manufactured by previously bonding the first member 120 to a surface of the exterior body 730, and then sealing the power generating element 110 with the exterior body 730 in a state in which the bonded surface is positioned on an inner side. Since the first member 120 is bonded to the surface of the exterior body 730, the first member 120 is suppressed from moving within the exterior body 730, whereby it is easier to fix a positional relationship between the power generating element 110 and the first member 120.

Embodiment 8

Embodiment 8 will be described below.

Figure 8:
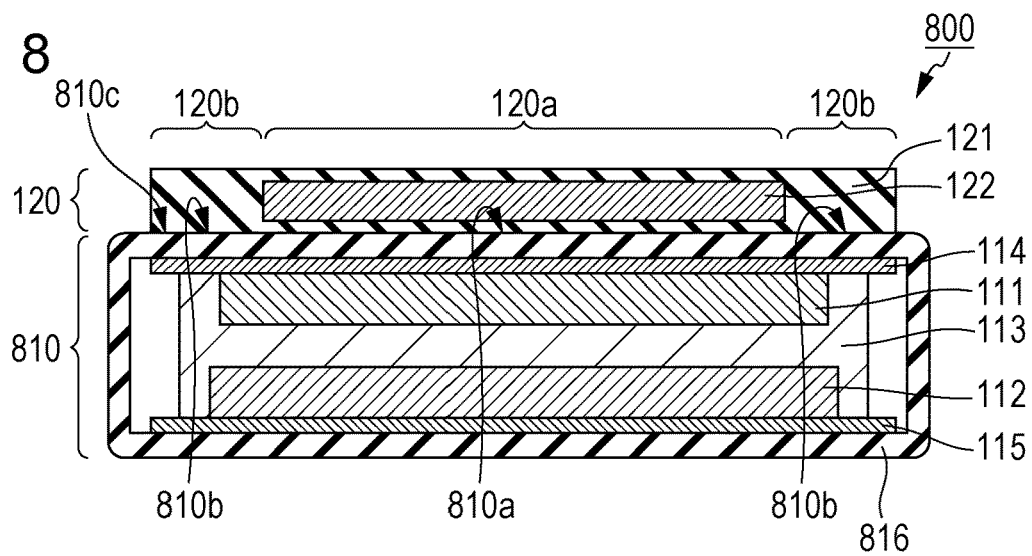
FIG. 8 is a sectional view illustrating a schematic structure of a battery according to Embodiment 8.

FIG. 8 is a sectional view illustrating a schematic structure of a battery 800 according to this embodiment. As illustrated in FIG. 8, comparing with the battery 100 according to Embodiment 1, the battery 800 according to this embodiment is different in including a power generating element 810 instead of the power generating element 110. In the following, different points from Embodiment 1 are primarily described and description of common points is omitted or simplified.

As illustrated in FIG. 8, unlike the power generating element 110 according to Embodiment 1, the power generating element 810 additionally includes the exterior body 816. The exterior body 816 surrounds a main body portion of the power generating element 810. More specifically, the exterior body 816 surrounds the entirety of the laminated structure made up of the positive electrode current collector 114, the positive electrode 111, the solid electrolyte layer 113, the negative electrode 112, and the negative electrode current collector 115. The exterior body 816 is formed using, for example, an insulating resin material. The resin material forming the exterior body 816 may be given as, for example, the same material as the resin material included in the first portion 121 of the first member 120.

Since the power generating element 810 includes the exterior body 816, a principal surface 810c of the power generating element 810 corresponds to a surface of the exterior body 816. More specifically, a central portion 810a of the principal surface 810c is a portion of the surface of the exterior body 816, the portion overlapping with the positive electrode 111 in a plan view. The central portion 810a is in contact with the central region 120a of the first member 120.

An end portion 810b of the principal surface 810c is part of the surface of the exterior body 816 and is in contact with the first member 120. The end portion 810b is in contact with the end region 120b of the first member 120.

As described above, the first member 120 is positioned outside the exterior body 816 and is in contact with the surface of the exterior body 816. More specifically, the first member 120 is bonded to the surface of the exterior body 816. Since the first member 120 is bonded to the surface of the exterior body 816, the first member 120 can be more easily arranged outside the exterior body 816 in manufacturing the battery. For example, the battery 800 is manufactured by sealing the laminated structure of the power generating element 810 with the exterior body 816, and then bonding the first member 120 to the surface of the exterior body 816. Instead, the battery 800 may be manufactured by bonding the first member 120 to the surface of the exterior body 816, and then sealing the laminated structure of the power generating element 810 with the exterior body 816 in a state in which the bonded surface is positioned on an outer side. Since the first member 120 is bonded to the surface of the exterior body 816, the first member 120 is suppressed from moving outside the exterior body 816, whereby it is easier to fix a positional relationship between the power generating element 810 and the first member 120.

Embodiment 9

Embodiment 9 will be described below.

Figure 9:
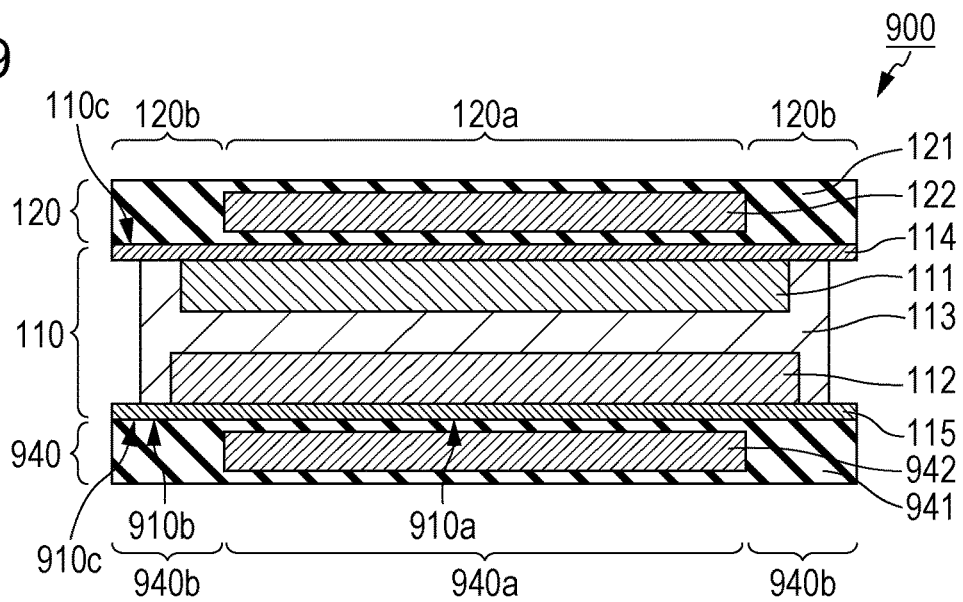
FIG. 9 is a sectional view illustrating a schematic structure of a battery according to Embodiment 9.

FIG. 9 is a sectional view illustrating a schematic structure of a battery 900 according to this embodiment. As illustrated in FIG. 9, comparing with the battery 100 according to Embodiment 1, the battery 900 according to this embodiment is different in additionally including a second member 940. In the following, different points from Embodiment 1 are primarily described and description of common points is omitted or simplified.

As illustrated in FIG. 9, the power generating element 110 is sandwiched between the first member 120 and the second member 940. In other words, the second member 940 is in contact with a principal surface 910c of the power generating element 110 on an opposite side to the principal surface 110c thereof. The principal surface 910c is an example of a second principal surface of the power generating element 110. The principal surface 910c is a principal surface of the negative electrode current collector 115 on a side where the negative electrode 112 is not disposed.

For example, a central portion 910a and an end portion 910b of the principal surface 910c of the power generating element 110 match respectively with the central portion 110a and the end portion 110b of the principal surface 110c in a plan view. For example, a shape of the central portion 910a in a plan view matches with that of the positive electrode 111 in a plan view. For example, the end portion 910b corresponds to the entire remaining portion of the principal surface 910c except for the central portion 910a in a plan view.

The second member 940 is in contact with the principal surface 910c of the power generating element 110. In this embodiment, the second member 940 is a member in the form of a flat plate. As illustrated in FIG. 9, the second member 940 includes a central region 940a and an end region 940b in a plan view. The central region 940a and the end region 940b are different regions in a plan view.

The central region 940a is an example of a second central region and overlaps with the central portion 910a of the principal surface 910c of the power generating element 110 in a plan view. In this embodiment, the central region 940a is in contact with the central portion 910a. A shape of the central region 940a in a plan view is rectangular, for example. However, the shape of the central region 940a in a plan view is not limited to a particular one and may be circular.

The end region 940b is an example of a second end region and overlaps with the end portion 910b of the principal surface 910c of the power generating element 110 in a plan view. In this embodiment, the end region 940b is in contact with the end portion 910b. The end region 940b has a ring-like shape surrounding the central region 940a in a plan view. For example, the end region 940b has a rectangular ring-like shape with a uniform width.

In this embodiment, the second member 940 is constituted in the same way as the first member 120. A Young's modulus of the end region 940b of the second member 940 is smaller than that of the central region 940a of the second member 940. More specifically, as illustrated in FIG. 9, the second member 940 includes a first portion 941 and a second portion 942. A Young's modulus of the first portion 941 is smaller than that of the second portion 942.

The first portion 941 is formed using, for example, a material selected from a selection group of the materials that can be used to form the first portion 121. The first portion 941 and the first portion 121 may be formed using the same material or different materials. Similarly, the second portion 942 is formed using, for example, a material selected from a selection group of the materials that can be used to form the second portion 122. The second portion 942 and the second portion 122 may be formed using the same material or different materials.

According to this embodiment, as described above, the first member 120 and the second member 940 are arranged respectively on the upper surface and the lower surface of the power generating element 110. Therefore, when pressure is applied to the first member 120 and the second member 940 from above and below with the battery 900 being confined, the pressure change at each of the boundary between the end region 120b and the central region 120a and a boundary between the end region 940b and the central region 940a is further relieved. As a result, the failure, such as cracking of the power generating element 110, attributable to the abrupt pressure change is even less likely to occur.

OTHER EMBODIMENTS

The battery according to one or more aspects has been described above in connection with the embodiments, but the present disclosure is not limited to the above-described embodiments. Batteries according to other aspects, which are obtained by applying various modifications conceivable by those skilled in the art to the above-described embodiments and are constituted by combining the components in the different embodiments with each other, also fall within the scope of the present disclosure insofar as not departing from the gist of the present disclosure.

For example, each of the above-described embodiments may include the second member 940 as in Embodiment 9. In this case, the second member 940 may be constituted in the same way as one of the first members 120, 220, 320 and 420 in Embodiments 1 to 4. The first member 120 arranged on an upper side of the power generating element 110 and the second member 940 arranged on a lower side thereof may be constituted in different ways.

For example, as in Embodiment 5, the power generating element 110 may not need to include the current collector, and the second member 940 may function as the current collector. Furthermore, as in Embodiment 7 or 8, the second member 940 may be disposed inside the exterior body 730 or outside the exterior body 816.

For example, in Embodiment 6, the first member 620 may include the second portion 942 described in Embodiment 9. In other words, the first member 620 functioning as the exterior body may be formed such that the Young's modulus is smaller in the end region than in the central region in each of a side close to the positive electrode current collector 114 and a side close to the negative electrode current collector 115.

Various alterations, replacements, additions, omissions, and so on can be made on the above-described embodiments within the scope defined in Claims and the scope equivalent to Claims.

The battery according to the present disclosure can be used as, for example, an all-solid-state lithium secondary battery.

What is claimed is:
1. A battery comprising:
a power generating element containing a solid electrolyte; and
a first member in contact with a first principal surface of the power generating element, wherein:
the first principal surface includes:
a central portion; and
an end portion with a ring-like shape surrounding the central portion in a plan view of the first principal surface,
the first member includes:
a first portion and a second portion having a different Young's modulus than the first portion, the first portion contacting and covering all surfaces of the second portion;

a first central region overlapping with the central portion of the first principal surface in a plan view of the first member; and a first end region overlapping with the end portion of the first principal surface in the plan view of the first member, at least one of the first central region or the first end region is in contact with the first principal surface, and a Young's modulus of the first end region is smaller than a Young's modulus of the first central region.

2. The battery according to claim 1,
wherein the first central region is in contact with the central portion of the first principal surface, and
the first end region is in contact with the end portion of the first principal surface.

3. The battery according to claim 1,
wherein one of the first central region and the first end region is in contact with the first principal surface.

4. The battery according to claim 1, wherein:
a Young's modulus of the first portion is smaller than a Young's modulus of the second portion,
at least part of the first portion is positioned within the first end region, and
at least part of the second portion is positioned within the first central region.

5. The battery according to claim 1,
wherein the first portion contains resin, and
the second portion contains metal.

6. The battery according to claim 5,
wherein the resin contains a conductive polymer.

7. The battery according to claim 1,
wherein the first portion and the second portion contain metal.

8. The battery according claim 4,
wherein the power generating element includes an electrode layer, and
an area of the second portion in the plan view of the first member is smaller than an area of the electrode layer in a plan view of the electrode layer.

9. The battery according to claim 4,
wherein the power generating element includes an electrode layer, and
an area of the second portion in the plan view of the first member is larger than an area of the electrode layer in a plan view of the electrode layer.

10. The battery according to claim 8,
wherein the first member is in contact with a surface of the electrode layer.

11. The battery according to claim 10,
wherein the first member is a current collector.

12. The battery according to claim 1,
wherein the power generating element includes a current collector, and
the first member is in contact with a surface of the current collector.

13. The battery according to claim 1,
wherein the first member is an exterior body for the power generating element.

14. The battery according to claim 1, further comprising an exterior body that covers the power generating element,
wherein the first member is positioned between the power generating element and the exterior body and is in contact with an inner surface of the exterior body.

15. The battery according to claim 1,
wherein the power generating element further includes an exterior body, and
the first member is positioned outside the exterior body and is in contact with a surface of the exterior body.

16. The battery according to claim 1, further comprising a second member in contact with a second principal surface of the power generating element on an opposite side to the first principal surface,
wherein the second principal surface includes:
a central portion; and
an end portion with a ring-like shape surrounding the central portion in a plan view of the second principal surface,
the second member includes:
a second central region overlapping with the central portion of the second principal surface in a plan view of the second member; and
a second end region overlapping with the end portion of the second principal surface in the plan view of the second member,
at least one of the second central region or the second end region is in contact with the second principal surface, and
a Young's modulus of the second end region is smaller than a Young's modulus of the second central region.

17. The battery according to claim 1,
wherein a thickness of the first end region is equal to a thickness of the first central region.

18. The battery according to claim 1,
wherein a thickness of the first end region is thicker than a thickness of the first central region.

19. The battery according to claim 1,
wherein a thickness of the first end region is thinner than a thickness of the first central region.

* * * * *